United States Patent
Ando (10) Patent No.: US 8,605,299 B2
(45) Date of Patent: Dec. 10, 2013

(54) TERMINAL AND COMPUTER PROGRAM

(75) Inventor: Satoko Ando, Chita (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 413 days.

(21) Appl. No.: 12/881,478

(22) Filed: Sep. 14, 2010

(65) Prior Publication Data

US 2011/0075206 A1 Mar. 31, 2011

(30) Foreign Application Priority Data

Sep. 29, 2009 (JP) .................................. 2009-224002

(51) Int. Cl.
*G06F 3/12* (2006.01)

(52) U.S. Cl.
USPC ........................................ 358/1.13; 358/1.15

(58) Field of Classification Search
USPC ............................................. 358/1.13, 1.15
See application file for complete search history.

(56) References Cited

U.S. PATENT DOCUMENTS

| | | | | |
|---|---|---|---|---|
| 7,606,874 B2 * | 10/2009 | Machida | ....................... | 709/217 |
| 7,791,753 B2 * | 9/2010 | Matsumoto et al. | ......... | 358/1.15 |
| 8,289,540 B2 * | 10/2012 | Ohshima | ..................... | 358/1.15 |
| 2008/0151295 A1 * | 6/2008 | Lee | ............................. | 358/1.15 |

FOREIGN PATENT DOCUMENTS

| | | |
|---|---|---|
| JP | 2006-252095 | 9/2006 |
| JP | 2007-140957 | 6/2007 |

\* cited by examiner

*Primary Examiner* — Twyler Haskins
*Assistant Examiner* — Jonathan Beckley
(74) *Attorney, Agent, or Firm* — Scully, Scott, Murphy & Presser, P.C.

(57) ABSTRACT

A terminal on which a device driver for a device is installed, comprising an obtaining section obtaining, from the device, setting method information for a first IP address that is currently set to the device; and a port generating section generating a port corresponding to the device when the device driver is being installed to the terminal. The port generating section generates the port by using the first IP address currently set to the device in a case where the setting method information indicates a first type of setting method where an IP address is set to the device as a result of an user input of the IP address to the device, and generates the port by using a device name currently set to the device in a case where the setting method information indicates a second type of setting method different from the first type of setting method.

15 Claims, 4 Drawing Sheets

TERMINAL AND COMPUTER PROGRAM

CROSS REFERENCE TO RELATED APPLICATION

The present application claims priority from Japanese Patent Application No. 2009-224002 filed on Sep. 29, 2009 and the subject matter of which is incorporated herein by reference.

TECHNICAL FIELD

The invention disclosed in this specification relates to a terminal in which a device driver for a device is installed.

BACKGROUND

For example, there is a related terminal in which a printer driver for a specific printer is installed. When the printer driver is installed, the terminal obtains the IP address and the MAC address of the specific printer, and generates a printer port corresponding to the specific printer using the IP address. When the terminal causes the specific printer to execute a printing process, the terminal checks whether or not unicast communication with the specific printer is possible using the IP address corresponding to the generated printer port. The terminal transmits data to be printed using the IP address as a transmission destination when unicast communication with the specific printer is determined to be possible. On the other hand, for example, when the IP address of the specific printer is changed to a new IP address by a DHCP (Dynamic Host Configuration Protocol) server or the like, unicast communication with the above-described specific printer is determined not to be possible. In this case, the terminal transmits a command including the obtained MAC address to all printers connected to the network. The specific printer having the MAC address transmits a response including the above-described new IP address. The terminal generates a new printer port using the above-described new IP address, and transmits the data to be printed using the above-described new IP address as the transmission destination.

SUMMARY

In the above described related art terminal, it is necessary for the terminal to generate a new printer port when the IP address of the above-described specific printer is changed. When the new printer port is generated, resources (for example, a CPU, a memory, and the like) of the terminal are used. Accordingly, generating of a new printer port needs to be desirably prevented.

Exemplary embodiments of the present invention are capable of preventing a new port from being generated as compared to the related art.

The first aspect of the exemplary embodiments of the present invention is a terminal on which a device driver for a device is installed. The terminal comprises a obtaining section configured to obtain, from the device, a setting method information for a first IP address that is currently set to the device. The terminal also comprises a port generating section configured to generate a port corresponding to the device when the device driver is being installed to the terminal. The port generating section generates the port by using the first IP address that is currently set to the device in a first case where the setting method information indicates a first type of setting method being a method where an IP address is set to the device as a result that an user input the IP address to the device. The port generating section also generates the port using a device name that is currently set to the device in a second case where the setting method information indicates a second type of setting method different from the first type of setting method.

Since the terminal of the first aspect obtains the setting method information, the terminal can prevent a new port from being generated by generating the port on the basis of the setting method information.

Specifically, in a first case where the setting method information indicates the first type of setting method, the terminal generates the port using the first IP address set to the device at the time of the driver installation. In the first case, the IP address of the device is generally not changed. Thus, it is possible to prevent a new port from being generated due to a change of the IP address of the device even though the port is generated by using the IP address. In the terminal of the second aspect, in a second case where the setting method information indicates the second type of setting method (for example, the case where the IP address is set to the device by a DHCP server or the like), the terminal generates the port using the device name pertained to the device at the time of the driver installation. In the second case, there is a high possibility that the IP address of the device may be changed. Thus, it is necessary to generate a new port with the change of the IP address when the port is generated by using the IP address. In this regard, the device name of the device is generally not changed. Thus, it is possible to prevent the new port from being generated by generating the port by using the device name.

The obtaining section may obtain at least one of the first IP address and the device name, which are set to the device at the time of the driver installation, from the device. The port generating section may generate the port using the obtained first IP address in the first case. The port generating section may generate the port using the obtained device name in the second case.

A control method and a computer program for implementing the above-described terminal are also newly useful. A system including the above-described terminal and the above-described device is also newly useful.

EXEMPLARY EMBODIMENTS

Figure 1:
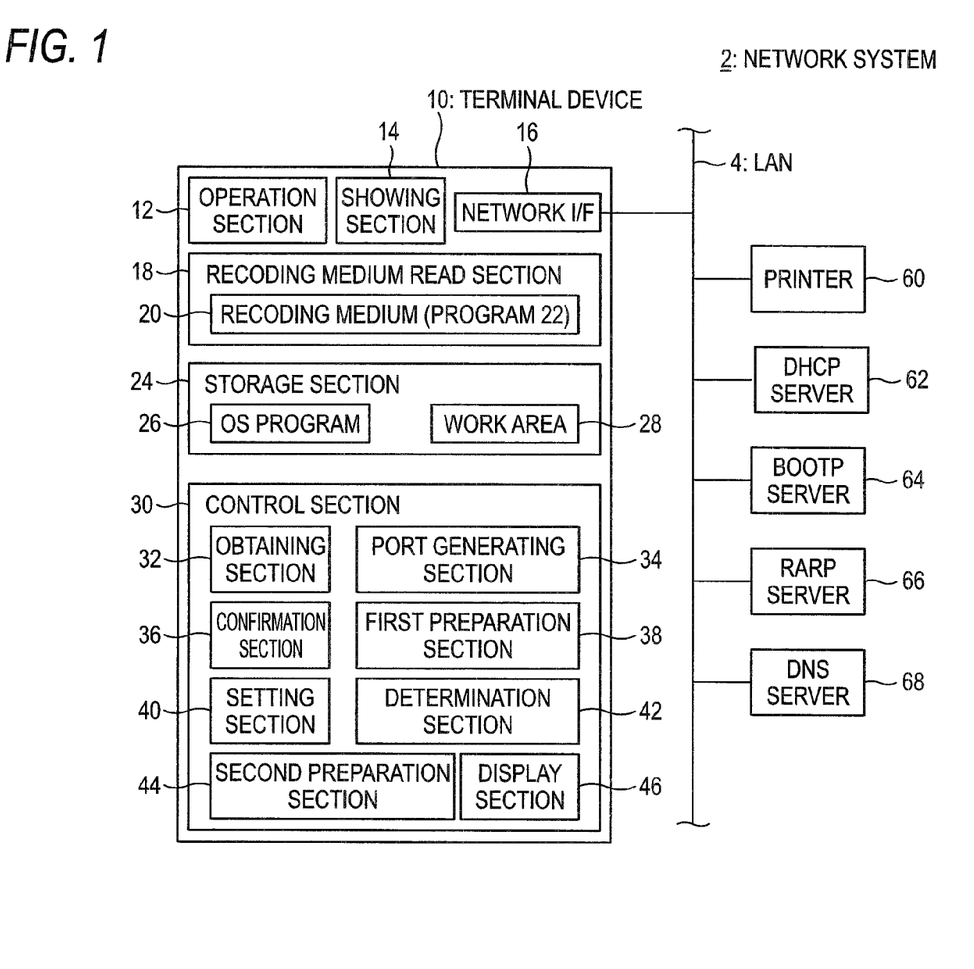
FIG. 1 is an exemplary configuration of a network system.

First Exemplary Embodiment (Configuration of System)
the first embodiment will be described with reference to the drawings. As shown in FIG. 1, a network system 2 includes a LAN 4, a terminal 10, a printer 60, and a plurality of servers 62 to 68. Each of the devices 10, 60, and 62 to 68 is connected to the LAN 4. The device 10 and the like are mutually communicable via the LAN 4.

(Configuration of Terminal 10)
The terminal 10 of this embodiment is a PC. The terminal 10 includes an operation section 12, a showing section 14, a network interface 16, a recording medium read section 18, a storage section 24, and a control section 30. The operation section 12 is constituted by a mouse and a keyboard. A user can input various instructions to the terminal 10 by operating the operation section 12. The showing section 14 is a device for displaying various types of information. The network interface 16 is connected to the LAN 4. The recording medium read section 18 reads data (for example, a program 22) stored on a recording medium 20. The recording medium 20 is a medium such as CD, DVD, or the like for storing data, and is manufactured by the vendor of the printer 60. At the time of shipping the printer 60, the recording medium 20 is packaged with the printer 60. The program 22 included in the recording medium 20 includes a printer driver for the printer 60 and a program for installing the printer driver. The storage section 24 stores an OS (Operating System) program 26. The storage section 24 has a work area 28 in which various data are stored. The control section 30 executes various processes according to the programs 22 and 26. As the control section 30 executes a process according to the program 22, the function of each of the sections 32 to 46 is implemented.

(Configuration of Other Devices 60 to 68)

The printer 60 is a device having at least a printing function. The printer 60 may be a multi-function device additionally having a scanner function, a copy function, a FAX function, a phone function, and the like. The printer 60 has a MAC address preset by the vendor. A node name is set to the printer 60. At the time of shipping the printer 60, a default node name is set to the printer 60. The user can input a desired node name to the printer 60 by operating an operation section (not shown) of the printer 60. Consequently, the input node name is set to the printer 60 instead of the default node name. Furthermore, an IP address is set to the printer 60. A setting method of an IP address will be described below in detail. Hereinafter, the expressions "an IP address (or node name) set to a device (for example, the printer 60)" and "an IP address (or node name) of a device" are used, but, for example, these expressions may be reworded as the expression "an IP address (or node name) used by a device as its own IP address (or node name)".

The DHCP server 62 allocates an IP address to a target device (for example, the printer 60) to be connected to the LAN 4. For example, when the target device is powered on, the DHCP server 62 provides the target device with an IP address, which is not set to other devices connected to the LAN 4. The target device newly sets the IP address, which is transmitted from the DHCP server 62, as its own IP address. The BOOTP (Bootstrap Protocol) server 64 executes the same process as the DHCP server 62, thereby allocating an IP address to the target device (for example, the printer 60) connected to the LAN 4. The DHCP server 62 and the BOOTP server 64 may be collectively referred to as "IP address allocating servers".

The RARP (Reverse Address Resolution Protocol) server 66 stores an IP address to be set to the target device (for example, the printer 60) connected to the LAN 4 and a MAC address of the target device. The IP address and the MAC address are stored in the RARP server 66, while being interrelated to each other. For example, the user may input the IP address to be set to the target device and the MAC address of the target device to the RARP server 66 by operating an operation section (not shown) of the RARP server 66. In this case, the RARP server 66 stores the IP address and the MAC address input by the user to the RARP server 66. In another example, the user may input the IP address to be set to the target device and the MAC address of the target device to the terminal 10 by operating the operation section 12 of the terminal 10. In this case, the terminal 10 transmits the IP address and the MAC address to the RARP server 66. Consequently, the RARP server 66 stores the IP address and the MAC address input by the user to the terminal 10 while interrelating the IP address and the MAC address. In another example, when the target device is powered on, the target device transmits a command including its own MAC address to the RARP server 66. The RARP server 66 transmits a response including the IP address associated with the MAC address included in the transmitted command. Consequently, the target device newly sets the IP address included in the response transmitted from the RARP server 66 as its own IP address.

For each device (for example, the printer 60) of which the IP address is set by the DHCP server 62 or the BOOTP server 64, the DNS (Domain Name System) server 68 stores and interrelating the IP address set to the device and the node name set to the device. For example, the DHCP server 62 or the BOOTP server 64 transmits the IP address and the node name of the target device to the DNS server 68 at the time of allocating the IP address to the DNS server 68. Consequently, the DNS server 68 stores and interrelate the IP address and the node name transmitted from the DHCP server 62 or the BOOTP server 64. A device (for example, the terminal 10) connected to the LAN 4 can obtain an IP address of another device with which the device communicates by providing the DNS server 68 with a node name of another device interrelated to the IP address of another device.

(Method for Setting IP Address on Printer 60)

In this first exemplary embodiment, there is a plurality of types of setting methods including "Static", "DHCP", "BOOTP", "RARP", and "AUTO" as methods for setting an IP address on the printer 60. In this embodiment, the user stores the IP address in the printer 60 by operating the operation section of the printer 60. Alternatively, for example, the user may set the IP address on the printer 60 by connecting the printer 60 to the terminal 10 using a USB cable or the like and operating the operation section 12 of the terminal 10. The user selects one type of setting method from among the plurality of types of setting methods by operating the operation section of the printer 60.

(Static)

When the setting method "Static" has been selected, the user inputs an IP address to be set to the printer 60 to the printer 60 by operating the operation section of the printer 60. The printer 60 newly sets the input IP address as its own IP address. In this case, the printer 60 stores the setting method information indicating that the setting method of its own IP address is "Static".

(DHCP or BOOTP)

When "DHCP" or "BOOTP" has been selected, the printer 60 obtains an IP address, which is not set to other devices connected to the LAN 4, from the DHCP server 62 or the BOOTP server 64 by transmitting a command to the DHCP server 62 or the BOOTP server 64. The printer 60 newly sets the obtained IP address as its own IP address. In this case, the printer 60 stores the setting method information indicating that the setting method of its own IP address is "DHCP" when the IP address is obtained from DHCP server 62 or "BOOTP" when the IP address is obtained from the BOOTP server 64. The IP address allocating server (the DHCP server 62 or the BOOTP server 64) can be represented by a sever having a function of offering the IP address to the printer 60. The IP address offered by the IP address allocating server is not permanently used in the printer 60. Accordingly, when the setting method "DHCP" or "BOOTP" has been selected, the IP address of the printer 60 can be changed.

(RARP)

When the setting method "RARP" has been selected, the printer 60 obtains an IP address associated with a MAC address from the RARP server 66 by providing the RARP server 66 with a command including its own MAC address. When the setting method "RARP" is selected, it is necessary for the user to input (register) in advance the IP address to be set to the printer 60 and the MAC address of the printer 60 to the RARP server 66. The printer 60 newly sets the input IP address as its own IP address. In this case, the printer 60 stores the setting method information indicating that the setting method of its own IP address is "RARP".

(AUTO)

When the setting method "AUTO" has been selected, the printer 60 executes a first trial process of trying to select one type of setting method from among three types of setting methods of "DHCP", "BOOTP", and "RARP" and to obtain an IP address using the selected setting method. When the IP address is not retrievable in the first trial process, the printer 60 executes a second trial process of trying to select one type of setting method from the remaining two types of setting methods and to obtain the IP address using the selected setting method. When the IP address is not retrievable in the second trial process, the printer 60 executes a third trial process of trying to obtain the IP address using the remaining one type of setting method. A selection sequence of the above-described three types of setting methods is preset. The printer 60 newly sets the IP address obtained in one of the first to third trial processes as its own IP address. In this case, the printer 60 stores the setting method information ("DHCP", "BOOTP", or "RARP") indicating a setting method corresponding to a trial process capable of obtaining the IP address. In place thereof, the printer 60 may store the setting method information indicating that the setting method of its own IP address is "AUTO".

(APIPA (Automatic Private IP Addressing))

When the setting method "DHCP", "BOOTP", or "RARP" has been selected, a situation where the printer 60 cannot obtain the IP address may occur. For example, when a server (for example, the DHCP server 62) corresponding to the selected setting method (for example, "DHCP") does not exist, the printer 60 is incapable of obtaining the IP address. In another example, when "RARP" has been selected in a state where the IP address to be set to the printer 60 and the MAC address of the printer 60 are not registered in the RARP server 66, the printer 60 is incapable of obtaining the IP address. When "DHCP", "BOOTP", and "RARP" have been selected, the printer 60 generates the IP address to be set to the printer 60 according to APIPA in the case where the IP address has been incapable of being obtained. When "AUTO" has been selected, the printer 60 generates the IP address to be set to the printer 60 according to APIPA in the case where the IP address has been incapable of being obtained even in the above-described third trial process. The printer 60 stores an algorithm for generating the IP address according to APIPA in advance. The printer 60 newly sets the IP address, generated according to APIPA, as its own IP address. When the IP address is set to the printer 60 according to APIPA, the printer 60 stores the setting method information indicating "AUTO". In this situation, the printer 60 may store the setting method information indicating the setting method ("DHCP", "BOOTP", "RARP", or "AUTO") selected by the user.

(Process to be Executed by Terminal 10)

Figure 2:
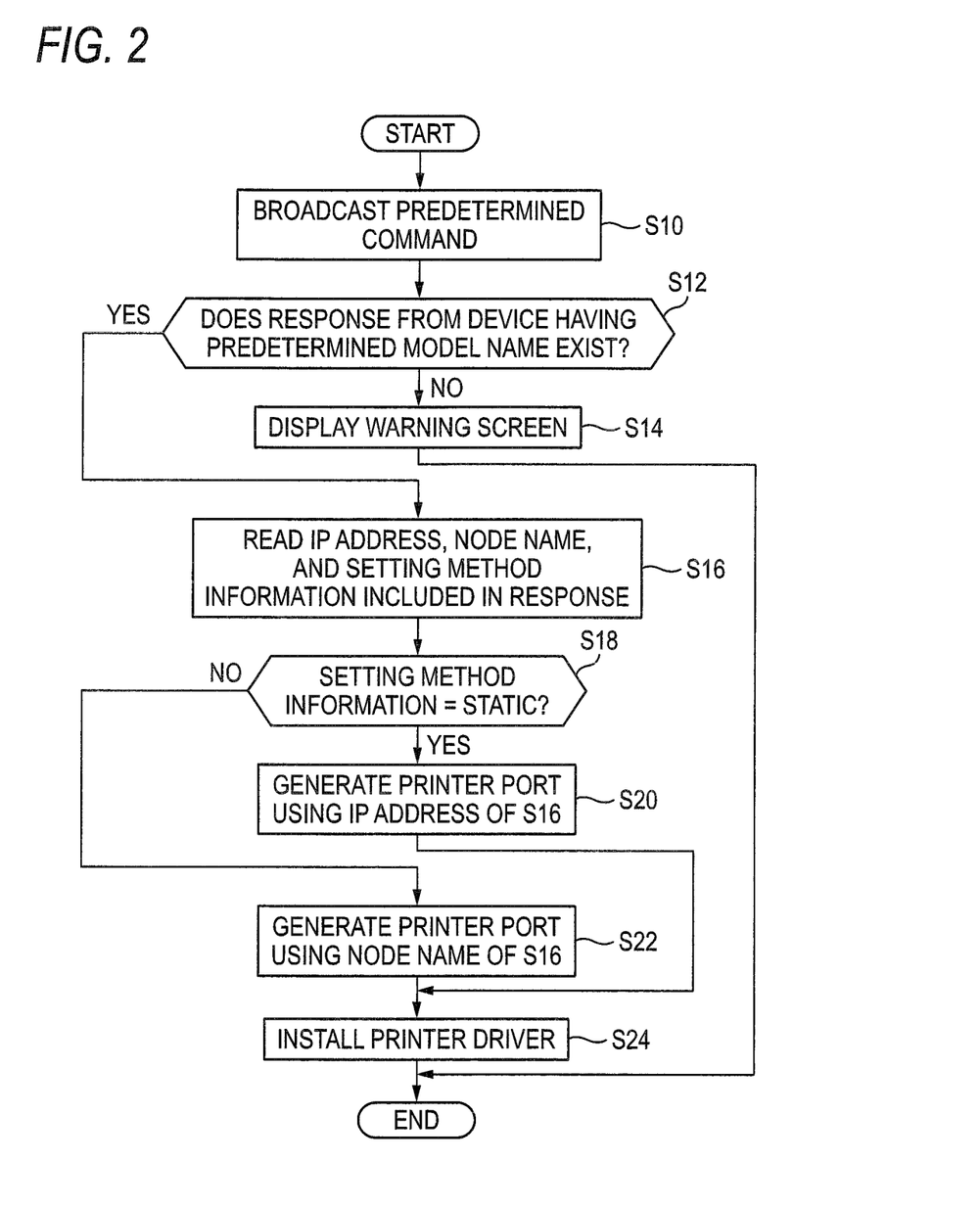
FIG. 2 shows a flowchart of a process to be executed by a terminal of a first embodiment.

Subsequently, a process to be executed by the terminal 10 will be described. When the printer driver for the printer 60 is intended to be installed on the terminal 10, the user stores the recording medium 20 within the recording medium read section 18 and performs a predetermined operation on the operation section 12. Thereby, the control section 30 starts the recording medium read section 18 according to the OS program 26. Consequently, the recording medium read section 18 reads the program 22 stored in the recording medium 20 and stores the program 22 in the work area 28. Thereby, the control section 30 can execute the process according to the program 22 stored in the work area 28. FIG. 2 shows a flowchart of the process to be executed according to the program 22.

The obtaining section 32 (see FIG. 1) broadcasts a first command (S10). Since the program 22 is a program for the printer 60, the program 22 has a model name of the printer 60. The obtaining section 32 monitors the reception of a response including the model name included in the program 22 (S12). For example, when the first command has been received in a state where the printer 60 has normally been connected to the LAN 4, the printer 60 provides the terminal 10 with a first response including its own model name, its own IP address, its own node name, setting method information indicating a setting method of its own IP address, and the like. Consequently, the obtaining section 32 obtains the first response including the model name included in the program 22 and determines that the determination result of S12 is YES. On the other hand, for example, when the first command is incapable of being received in a state where the printer 60 is not normally connected to the LAN 4, the printer 60 is incapable of receiving the first command and transmitting the first response. In this case, the obtaining section 32 determines that the determination result of S12 is NO.

In the case of NO in S12, the control section 30 displays a warning screen on the showing section 14 (S14), and ends the process. On the other hand, in the case of YES in S12, the obtaining section 32 reads the IP address, the node name, and the setting method information included in the first response (S16). That is, the obtaining section 32 reads the IP address of the printer 60, the node name of the printer 60, and the setting method information indicating the setting method of the IP address of the printer 60. Next, the port generating section 34 (see FIG. 1) determines whether or not the setting method information read in S16 indicates "Static" (S18). In the case where the setting method information indicates "Static" (YES in S18), the port generating section 34 generates a printer port using the IP address of the printer 60 read in S16 (S20). That is, the port generating section 34 generates the printer port for which the IP address of the printer 60 read in S16 has been designated. Consequently, the printer port corresponding to the printer 60 is generated. The printer port is stored in the storage section 24.

When the setting method information read in S16 indicates a setting method ("DHCP", "BOOTP", "RARP", or "AUTO") other than "Static", the port generating section 34 determines that the determination result of S18 is NO. In this case, the port generating section 34 generates a printer port by using the node name of the printer 60 read in S16 (S22). That is, the port generating section 34 generates the printer port for which the node name of the printer 60 read in S16 has been designated. Consequently, the printer port corresponding to the printer 60 is generated. When S20 or S22 is ended, the control section 30 installs the printer driver by storing the printer driver, included in the program 22, in a predetermined area within the storage section 24 (S24).

A printing process to be executed using the printer port generated in S20 or S22 and the printer driver installed in S24 will be simply described. When the printer 60 is intended to execute the printing process, the user selects target data to be printed by operating the operation section 12 of the terminal 10. In this case, the control section 30 starts the printer driver stored in the storage section 24. The printer driver converts the target data into PDL (Page Description Language) data capable of being interpreted by the printer 60. As described above, the IP address of the printer 60 is designated in the generated printer port of S20. When the generated printer port of S20 is stored in the storage section 24, the control section 30 transmits the PDL data using the IP address designated for the printer port as a transmission destination. Consequently, the printer 60 executes the printing process according to the PDL data. The node name of the printer 60 is designated in the generated printer port of S22. When the generated printer port of S22 is stored in the storage section 24, the control section 30 obtains the IP address of the printer 60 by executing a name resolution process using the node name designated for the printer port. A name resolution method will be described in detail in a third embodiment to be described later. The control section 30 transmits the PDL data using the obtained IP address as the transmission destination. Consequently, the printer 60 executes the printing process according to the PDL data.

The configuration of the network system 2 of this embodiment has been described in detail. Since the setting method information is obtained from the printer 60, the terminal 10 can suppress a new printer port from being generated by generating the printer port based on the setting method information. Specifically, when the setting method information of the printer 60 indicates "Static", the terminal 10 generates the printer port using the IP address currently set to the printer 60 (S20). In the case of "Static", the IP address of the printer 60 is not generally changed. This is because the IP address input by the user is set to the printer 60. Thus, a new printer port can be prevented from being generated due to a change of the IP address of the printer 60 even when a port is generated using the IP address. As described above, the setting methods other than "Static" include "DHCP" and "BOOTP". In these setting methods, there is a high possibility that the IP address of the printer 60 may be changed. For example, a new IP address is set to the printer 60 at every time when the printer 60 is powered on. Thus, it is necessary for a new printer port to be generated with the change of the IP address when the printer port is generated using the IP address. Accordingly, when a setting method for the IP address of the printer 60 is a setting method other than "Static", the terminal 10 generates the printer port by using the node name currently set to the printer 60 (S22). In general, the node name of the printer 60 is not changed. Thus, a new printer port can be prevented from being generated when the printer port is generated using the node name.

On the basis of the assumption that the node name of the printer 60 is rarely changed, it is possible to adopt a configuration that executes only a printer port generating process based on the node name without executing a printer port generating process based on the IP address. However, when the printer port is generated using the node name as described above, it is necessary for the terminal 10 to execute the name resolution process at the time of causing the printer 60 to execute the printing process. In the name resolution process, for example, the terminal 10 obtains a packet including the IP address of the printer 60 from the DNS server 68. Alternatively, in the name resolution process, for example, the terminal 10 obtains a packet including the IP address of the printer 60 from the printer 60 by broadcasting a predetermined command. For example, when security software is installed in the terminal 10, there is a possibility that the security software may block the packet. In this case, the terminal 10 is incapable of obtaining the IP address of the printer 60 by the name resolution process. In view of this standpoint, the printer port of S20 generated using the IP address is effective. Even in the viewpoint of a load of the name resolution process, the printer port in S20 produced without executing the name resolution process is effective.

In the first exemplary embodiment, the printer 60 is an exemplary embodiment of the "device", the terminal 10 is an exemplary embodiment of a "terminal", the IP address read in S16 is an exemplary embodiment of the "first IP address", the node name read in S16 is an exemplary embodiment of the "device name". For example, "Static" is a "first type of setting method". For example, "DHCP", "BOOTP", "RARP", or "AUTO" is a "second type of setting method". For example, the case of YES in S18 and the case of NO in S18 are a "first case" and a "second case", respectively.

Second Embodiment

Figure 3:
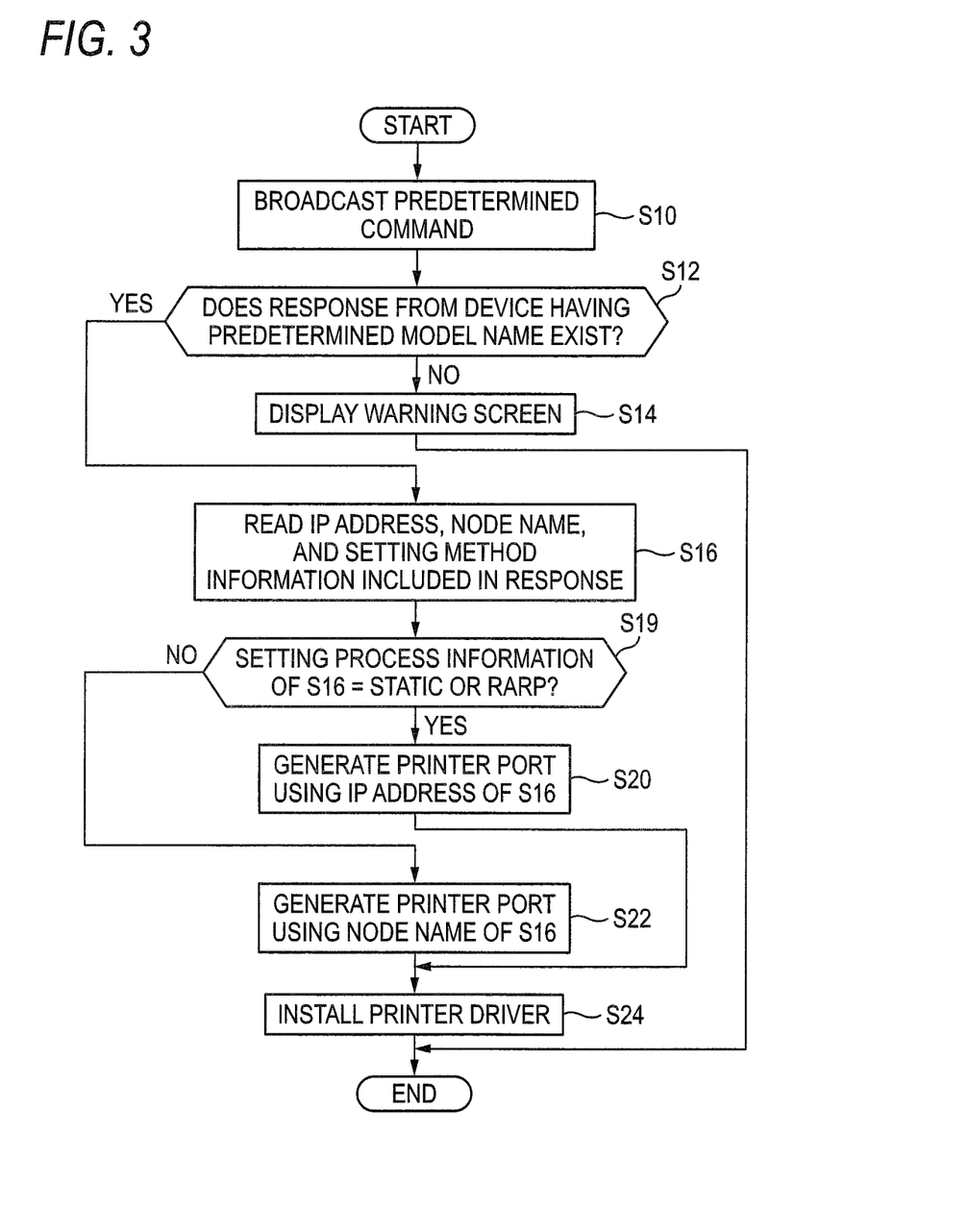
FIG. 3 shows a flowchart of a process to be executed by a terminal of a second embodiment.

In this embodiment, the control section 30 of the terminal 10 executes the flowchart of FIG. 3, instead of the flowchart of FIG. 2. The flowchart of FIG. 3 includes the process of S19, instead of S18. Only this point is different from the flowchart of FIG. 2. In S19, the port generating section 34 determines whether the setting method information read in S16 indicates "Static" or "RARP". Here, in the case where the setting method information read in S16 indicates "Static or RARP" (YES in S19), the port generating section 34 generates a printer port using the read IP address of S16 (S20). On the other hand, when the setting method information read in S16 indicates the setting method ("DHCP", "BOOTP", or "AUTO") other than "Static" or "RARP", the port generating section 34 determines that the determination result of S19 is NO. In this case, the port generating section 34 generates a printer port using the read node name of S16 (S22).

In the case of "RARP", the IP address of the printer 60 is not generally changed. This is because the IP address input by the user is set to the printer 60. Accordingly, when the setting method of the IP address of the printer 60 is "RARP" in this embodiment, the terminal 10 generates the printer port using the IP address currently set to the printer 60 (S20). Since the IP address of the printer 60 is rarely changed, it is possible to prevent a new printer port from being generated due to the change of the IP address of the printer 60.

In the second exemplary embodiment, the setting method "Static" is an exemplary embodiment of the "first type setting method", the setting methods "DHCP", "BOOTP", or "AUTO" is the "second type of setting method", and the setting method "RARP" is the "third type of setting method", the case where the determination result of S19 is YES since the setting method information read in S16 indicates "Static" is a "first case". For example, the case where the determination result of S19 is YES since the setting method information read in S16 indicates "RARP" is a "third case". For example, the case where the determination result of S19 is NO is a "second case".

Third Embodiment

Figure 4:
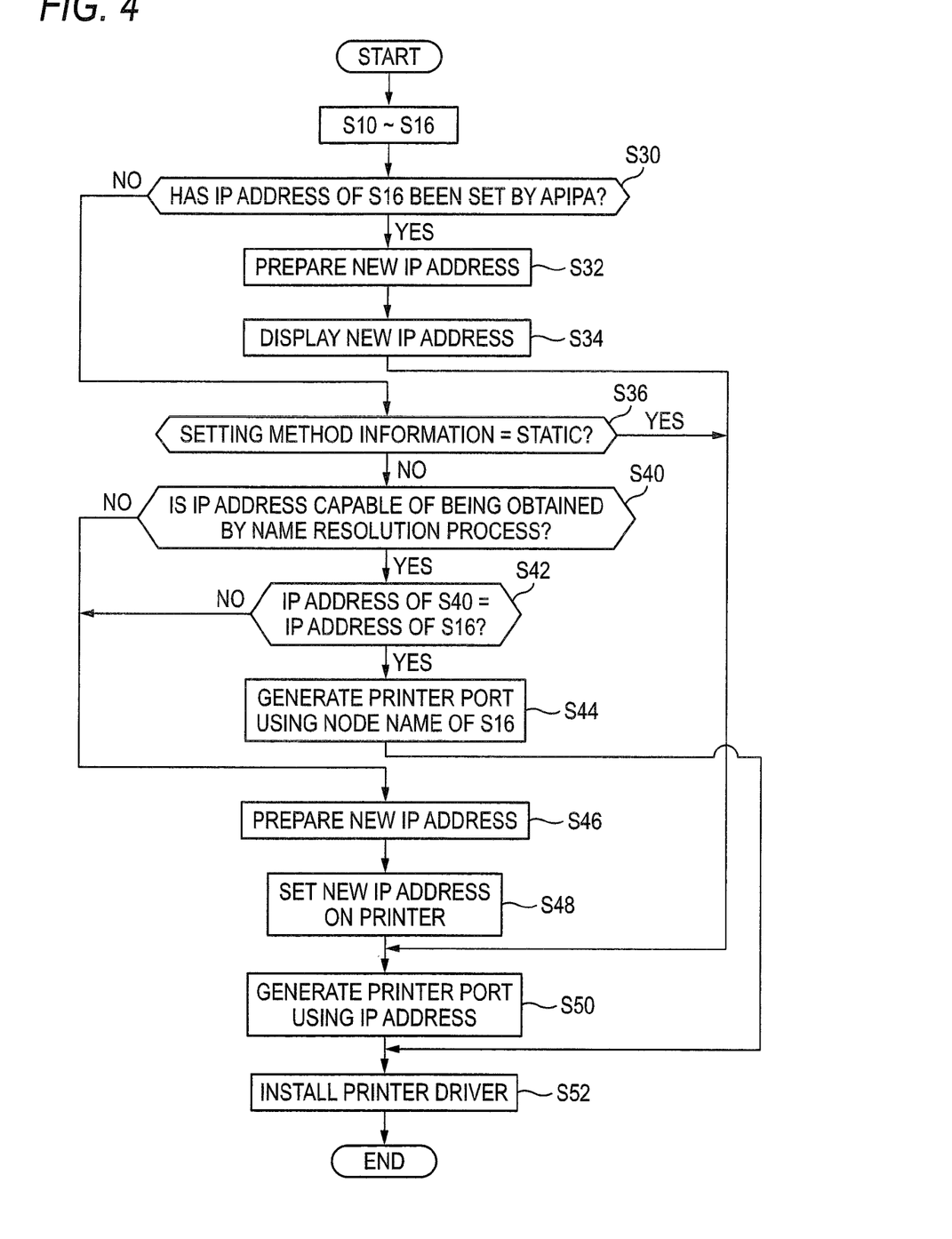
FIG. 4 shows a flowchart of a process to be executed by a terminal of a third embodiment.

In this embodiment, the control section 30 of the terminal 10 executes the flowchart of FIG. 4, instead of the flowcharts of FIGS. 2 and 3. S10 to S16 of the flowchart of FIG. 4 are the same as S10 to S16 of FIGS. 2 and 3. When S16 is ended, the control section 30 executes S30. In S30, the control section 30 determines whether or not the IP address of the printer 60 read in S16 has been generated according to APIPA. In APIPA, an IP address range (for example, "169.254.0.0" to "169.254.255.254") is preset, and the IP address included in the range is generated. When the IP address of the printer 60 read in S16 is included in the preset range, the control section 30 determines that the determination result of S30 is YES.

In the case where the IP address has been generated according to APIPA (YES in S30), the second preparation section 44 (see FIG. 1) prepares a new IP address to be set to the printer 60 (S32). For example, the second preparation section 44 prepares a new IP address by changing a least significant 8-bit value of the IP address set to the terminal 10. The terminal 10 checks that the changed new IP address is not used by other devices connected to the LAN 4. Next, the presentation section 46 (see FIG. 1) causes the showing section 14 to display the checked new IP address (S34). Consequently, the user can know the new IP address. For example, the user can set the new IP address on the printer 60 by operating the operation section of the printer 60 and selecting the setting method "Static". When S34 is ended, the port generating section 34 generates the printer port using the new IP address prepared in S32 (S50).

On the other hand, in the case of NO in S30, the port generating section 34 determines whether or not the setting method information read in S16 indicates "Static" (S36). Here, in the case of YES, the port generating section 34 generates the printer port using the IP address of the printer 60 read in S16 (S50). On the other hand, in the case of NO in S36, the check section 36 (see FIG. 1) checks whether or not the IP address of the printer 60 can be obtained by the name resolution process (S40). Specifically, the check section 36 broadcasts a second command including the node name of the printer 60 read in S16. The printer 60 connected to the LAN 4 receives the second command. The printer 60 having the node name included in the second command transmits a second response including its own IP address to the terminal 10. Other printers (not shown) connected to the LAN 4 also receive the second command, but do not transmit responses since the printers have node names different from the node name included in the second command. Even when the second response is received by the network interface 16 of the terminal 10, the check section 36 is possibly incapable of obtaining the second response. For example, when the security software is stored in the terminal 10, there is a possibility that the security software may block the second response. In this case, the check section 36 may not obtain the second response.

The following name resolution method may be adopted, instead of the above-described name resolution method. That is, the check section 36 provides the DNS server 68 with a third command including the node name of the printer 60 read in S16. When a combination of the node name of the printer 60 and the IP address of the printer 60 is registered to the DNS server 68, the DNS server 68 transmits a third response including the IP address of the printer 60 to the terminal 10. As in the case of the above-described second response, the check section 36 may not obtain the third response even though the third response is obtained by the network interface 16. The check section 36 is incapable of obtaining the third response when a combination of the node name of the printer 60 and the IP address of the printer 60 is not registered to the DNS server 68 or when the DNS server 68 is not connected to the LAN 4.

When the response (the second or third response) can be obtained by the above-described name resolution method, the check section 36 determines that the determination result of S40 is YES. In this case, the determination section 42 (see FIG. 1) determines whether or not the IP address included in the above-described response matches the read IP address of S16 (S42). Here, in the case of YES, the port generating section 34 generates the printer port using the read node name of S16 (S44). When S44 is ended, the process proceeds to S52.

In the case of NO in S40 or S42, the first preparation section 38 (see FIG. 1) prepares a new IP address to be set to the printer 60 (S46). The process of S46 is the same as the process of S32. Next, the setting section 40 (see FIG. 1) transmits the prepared new IP address of S46 using the IP address of the printer 60 read in S16 as a transmission destination (S48). For example, the process of S48 uses a SET command of SNMP (Simple Network Management Protocol). The printer 60 newly sets the new IP address transmitted from the terminal 10 as its own IP address. When S48 is executed, the printer 60 newly stores the setting method information indicating that the setting method of its own IP address is "Static".

When S48 is ended, the port generating section 34 generates the printer port using the prepared new IP address of S46 (S50). Next, the control section 30 installs the printer driver as in S24 of FIGS. 2 and 3 (S52).

The process to be executed by the terminal 10 of this embodiment has been described in detail. In general, the IP address is set by a method other than APIPA on the terminal 10 like the PC. When the IP address generated according to APIPA is set to the printer 60, a response can be transmitted by the printer 60 in response to a command broadcast from the terminal 10 (see S16), but a process (printing process) is incapable of being executed in response to a command (for example, a printing instruction command) unicast from the terminal 10. Accordingly, when the IP address of the printer 60 is generated according to APIPA in this embodiment, the terminal 10 prepares a new IP address to be set to the printer 60 (S32) and causes the showing section 14 to display the new IP address (S34). Since unicast communication may not be performed, in S34, a setting method (see S48) using unicast communication is not adopted. Since the process of S34 is executed, the user can set the new IP address on the printer 60 by inputting the new IP address to the printer 60 using the setting method "Static". Consequently, the new IP address, which enables the printer 60 to appropriately perform unicast communication, is set to the printer 60. In general, the IP address set according to the setting method "Static" is not changed. Accordingly, in this embodiment, the terminal 10 generates the printer port using the prepared new IP address of S32 (S50).

When the setting method of the printer 60 is a setting method other than "Static" in this embodiment, the terminal 10 attempts to execute the name resolution process. When the IP address is incapable of being obtained by the name resolution process (NO in S40), the terminal 10 generates the printer port by using the new IP address (the prepared IP address of S46) to be set to the printer 60 without using the node name of the printer 60 (S50). The printer port can be prevented from being generated using the node name in which the IP address is incapable of being obtained by the name resolution process. When the IP address obtained by the name resolution process does not match the IP address of the printer 60 read in S16 (NO in S42), this means that the name resolution process does not appropriately function. For example, when a correspondence relationship between a changed IP address and the node name of the printer 60 is not registered in the DNS server 68 regardless of a change of the IP address of the printer 60 by the DHCP server 62 or the like (that is, when a correspondence relationship between an IP address before a change and the node name of the printer 60 is still registered to the DNS server 68), the name resolution process does not appropriately function. In the case of NO in S42 even though the terminal 10 can obtain the IP address by the name resolution process (YES in S40), the terminal 10 generates the printer port using the new IP address to be set to the printer 60 (the IP address prepared in S46) (S50). When the name resolution process does not appropriately function, the printer port can be prevented from being generated using the node name.

A correspondence relationship between the configuration of the third embodiment and the configuration of the present invention may be described as follows. For example, the case of YES in S40 and the case of NO in S40 are a "fourth case" and a "fifth case", respectively. For example, the case of YES in S42 and the case of NO in S42 are a "sixth case" and a "seventh case", respectively. For example, an IP address prepared in S46 is a "second IP address". For example, APIPA is an "algorithm". For example, the case of YES in S30 is an "eighth case". For example, an IP address prepared in S32 is a "third IP address".

Modified examples of each embodiment described above are enumerated as follows.

(1) When the IP address of the printer 60 read in S16 of FIG. 2 is generated according to APIPA, the control section 30 may determine that the determination result of S18 is YES, and may generate the printer port using the IP address of the printer 60 read in S16 (the IP address generated according to APIPA).

(2) In S34 of FIG. 4, the presentation section 46 provides a new IP address to the user by causing the showing section 14 to display a new IP address. In place thereof, the presentation section 46 may cause a specific printer to print information indicating the new IP address, may audibly output the new IP address, and may cause a showing section of another device to display the new IP address.

(3) In S36 of FIG. 4, the control section 30 may determine that the determination result is YES in the case of "Static" or "RARP" as in the case of S19 of FIG. 3.

(4) In the case of NO in S40 or S42 of FIG. 4, the control section 30 may skip S46 and S48, and may generate the printer port using the read IP address of S16. In this modified example, a "first IP address" and a "second IP address" of the present invention are the same as each other.

(5) A device driver may not be installed from the recording medium 20. For example, the OS program 26 of the terminal 10 may include a device driver for the printer 60. In this case, the terminal 10 may install the device driver by storing the device driver, included in the OS program 26, in a predetermined area within the storage section 24.

(6) The technique of each embodiment described above can be applied even when another device driver different from the printer driver is installed on the terminal 10. For example, an example of the other device driver can include a scanner driver.

Specific examples of the present invention have been described above in detail, but they are only illustrative and do not limit the scope of the claims. Various changes and modifications in the specific examples illustrated above are included in the technique disclosed in the appended claims.

The technical elements described in this specification or the drawings exhibit technical utility when used alone or in various combinations, and are not limited to the combinations described in the claims as filed. The technique illustrated in this specification or the drawings can achieve a plurality of objects at the same time, and the technical utility can be provided by achieving one object thereof itself.

What is claimed is:

1. A terminal on which a device driver for a device is installed, the terminal comprising:
   a processor; and
   a memory storing computer-readable instructions that, when executed by the processor, cause the terminal to:
      obtain, from the device, setting method information for a first IP address that is currently set to the device, wherein the setting method information indicates one of a plurality of types of setting method including: (i) a first type of setting method that is a method where the IP address had been set to the device as a result that the first IP address is input to the device by a user; and
      (ii) a second type of setting method different from the first type of setting method; and
   generate a port corresponding to the device when the device driver is being installed to the terminal;
   wherein the port generating:
      (a) generates the port by using the first IP address that is currently set to the device in a first case where the setting method information indicates the first type of setting method; and
      (b) generates the port by using a device name that is currently set to the device in a second case where the setting method information indicates the second type of setting method.

2. The terminal according to claim 1, wherein the port generating:
   (c) generates the port by using the first IP address that is currently set to the device, in a third case where the setting method information indicates a third type of setting method different from the first and second types of setting method, the third type of setting method being a method where the first IP address is set to the device as a result that a first server transmits the first IP address input to the device by the user.

3. The terminal according to claim 1, wherein the computer-readable instructions further cause the terminal to:
   confirm whether a certain IP address corresponding to the device name is obtainable by name resolution in the second case,
   wherein the port generating:
      (b1) generates the port by using the device name, in a fourth case where the confirmation section confirms that the certain IP address is obtainable by name resolution; and
      (b2) generates the port by using a second IP address, in a fifth case where the confirmation section confirms that the certain IP address is not obtainable by name resolution.

4. The terminal according to claim 3, wherein the computer-readable instructions further cause the terminal to:
   prepare the second IP address that is to be newly set to the device in the fifth case; and
   transmit the second IP address to the device in order to set the second IP address to the device in the fifth case.

5. The terminal according to claim 3, wherein the computer-readable instructions further cause the terminal to:
   determine whether the first IP address currently set to the device and the certain IP address are identical in the fourth case, wherein:
      the port generating generates the port by using the device name, in a sixth case where the determination section determines that the first IP address and the certain IP address is are identical; and
      the port generating section generates the port by using the second IP address that is to be newly set to the device, in a seventh case where the determination section determines that the first IP address and the certain IP address are not identical.

6. The terminal according to claim 1, wherein the computer-readable instructions further cause the terminal to:
   prepare a third IP address that is to be newly set to the device, in an eighth case where the first IP address currently set to the device is an IP address that has been set to the device by the device itself according to a predetermined algorithm; and show the user the third IP address, wherein:
the port generating generates the port by using the third IP address in the eighth case.

7. The terminal according to claim 1, wherein the obtaining further obtains at least one of the first IP address and the device name that are currently set to the device, the port generating generates the port by using the obtained first IP address in the first case, and the port generating generates the port by using the obtained device name in the second case.

8. A non-transitory computer-readable medium storing computer-readable instructions for an installation of a device driver for a device, the instructions configured to cause a terminal to execute the steps of:
obtaining, from the device, setting method information for a first IP address that is currently set to the device, wherein the setting method information indicates one of a plurality of types of setting method including: (i) a first type of setting method that is a method where the IP address had been set to the device as a result that the first IF' address is input to the device by a user; and (ii) a second type of setting method different from the first type of setting method;
generating a port by using the first IP address that is currently set to the device when the device driver is being installed to the terminal, in a first case where the setting method information indicates the first type of setting method; and
generating the port by using a device name that is currently set to the device when the device driver is being installed to the terminal, in a second case where the setting method information indicates the second type of setting method.

9. The computer-readable medium according to claim 8, wherein the port generating generates the port by using the first IP address that is currently set to the device, in a third case where the setting method information indicates a third type of setting method different from the first and second types of setting method, the third type of setting method being a method where the first IP address is set to the device as a result that a first server transmits the first IP address input to the device by the user.

10. The computer-readable medium according to claim 8, wherein the instructions are configured to cause the terminal to execute the steps of:
confirming whether a certain IP address corresponding to the device name is obtainable by name resolution in the second case;
wherein the port generating:
generates the port by using the device name, in a fourth case where the confirmation section confirms that the certain IP address is obtainable by name resolution; and
generates the port by using a second IP address, in a fifth case where the confirmation section confirms that the certain IP address is not obtainable by name resolution.

11. The computer-readable medium according to claim 10, wherein the instructions are configured to cause the terminal to execute the steps of:

preparing the second IP address that is to be newly set to the device in the fifth case; and
transmitting the second IP address to the device in order to set the second IP address to the device in the fifth case.

12. The computer-readable medium according to claim 10, wherein the instructions are configured to cause the terminal to execute the steps of:
determining whether the first IP address currently set to the device and the certain IP address are identical in the fourth case, wherein:
the port generating generates the port by using the device name, in a sixth case where the determination section determines that the first IP address and the certain IP address are identical; and
the port generating generates the port by using the second IP address that is to be newly set to the device, in a seventh case where the determination section determines that the first IP address and the certain IP address are not identical.

13. The computer-readable medium according to claim 8, wherein the instructions are configured to cause the terminal to execute the steps of:
preparing a third IP address that is to be newly set to the device, in an eighth case where the first IP address currently set to the device is an IP address that has been set to the device by the device itself according to a predetermined algorithm; and
showing the user the third IP address, wherein:
the port generating generates the port by using the third IP address in the eighth case.

14. The computer-readable medium according to claim 8, wherein the obtaining further obtains at least one of the first IP address and the device name that are currently set to the device, the port generating generates the port by using the obtained first IP address in the first case, and the port generating generates the port by using the obtained device name in the second case.

15. A method for generating a port corresponding to a device of which a driver is installed on a terminal, the method comprising steps of:
obtaining, from the device, setting method information for a first IP address that is currently set to the device, wherein the setting method information indicates one of a plurality of types of setting method including: (i) a first type of setting method that is a method where the IP address had been set to the device as a result that the first IP address is input to the device by a user; and (ii) a second type of setting method different from the first type of setting method;
generating the port corresponding to the device when the device driver is being installed to the terminal by using the first IP address that is currently set to the device in a first case where the setting method information indicates the first type of setting method; and
generating the port corresponding to the device when the device driver is being installed to the terminal by using a device name that is currently set to the device in a second case where the setting method information indicates the second type of setting method.

* * * * *